INVENTOR.
ALBERT H. ASHLEY
BY F. L. Sullivan
ATTORNEY

INVENTOR.
ALBERT H. ASHLEY
BY F. I. Sullivan
ATTORNEY

MEMORY CONTROL SYSTEMS

Filed Oct. 14, 1960 3 Sheets-Sheet 3

INVENTOR.
ALBERT H. ASHLEY
BY F. L. Sullivan
ATTORNEY

United States Patent Office 3,247,494
Patented Apr. 19, 1966

3,247,494
MEMORY CONTROL SYSTEMS

Albert H. Ashley, Holliston, Mass., assignor to Sylvania Electric Products Inc., a corporation of Delaware Filed Oct. 14, 1960, Ser. No. 62,615
5 Claims. (Cl. 340—174)

This invention is concerned with electronic data processing equipment, and particularly with the operation of magnetic memory devices.

During the operation of certain electronic data processing equipments such as digital computers input data, intermediate results, and a sequenced program of machine operating instructions must be stored as binary bits in a memory subsystem. A typical memory for accomplishing this purpose is described in copending U. S. patent application Ser. No. 697,967, filed August 23, 1957, now Pat. No. 3,058,096, also assigned to Sylvania Electric Products Inc. In this type of memory, information is stored in binary bit form by causing the remanent magnetic flux of individual ferrite cores to assume an indicated stable condition. The cores are arranged in memory planes consisting of horizontal rows and vertical columns linked by X- and Y-coordinate conductors. By pulsing these conductors with current signals of proper polarity and amplitude, the cores are switched between stable conditions of remanent flux and data is thus written into, stored within, or read out of memory. Copending U.S. patent application Serial No. 60,613, now abandoned in favor of continuation application Serial No. 346,370 filed February 14, 1964, and assigned to Sylvania Electric Products Inc. discloses a system for providing the drive current pulses required to operate magnetic core memories in this manner.

In a typical computer the working memory may comprise several units containing from four to eight thousand multi-bit binary words each. If for any reason it is desired to shut down the computer in the midst of a programmed routine, it is necessary first to convert the contents of its memory to an intermediate storage device such as paper, magnetic tape, punched cards, etc. If this is not done, or if a sudden power failure causes the equipment to halt before it can be accomplished, the entire program, which generally involves expensive programming and machine time, is lost.

A principal object of the present invention is to provide a means for causing electronic data processing equipment to retain automatically in the magnetic storage bits of its working memory the data residing there at the time of an equipment shutdown. Another object is to provide an improved control system for the memory units of electronic data processing systems.

These and related objects are accomplished in one embodiment of the invention with a memory drive control system which insures that the X- and Y-coordinate conductors of a magnetic memory matrix do not experience spurious current pulses of the sort which will cause the memory cores to change their condition of remanent flux when power is either applied to or disconnected from the memory equipment. In this illustrative control system an interconnection of relays is employed in the power supply of a memory system so that driving current is withheld from the X- and Y-coordinate conductors during the period when control signals are being processed to the current switching devices and the memory address registers, etc, are being cleared.

Other objects and embodiments of the invention will be apparent from the following more detailed description of this illustrative system which will be described with reference to the accompanying drawings, wherein.

Figure 1:
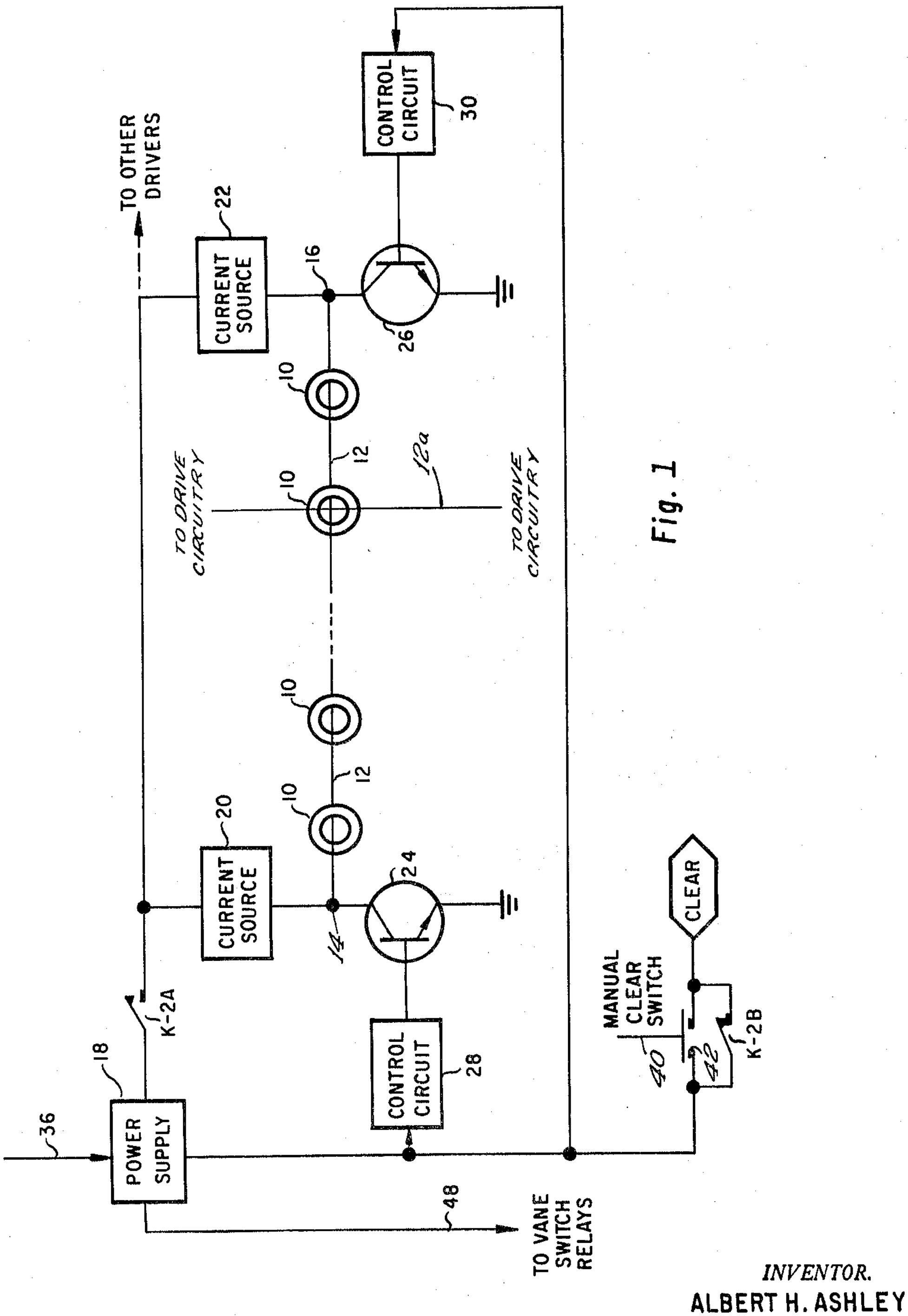
FIG. 1 is a combination schematic and block diagram of a memory drive system.

The circuit arrangement and operation of the memory drive system of FIG. 1 is described in detail in continuation U.S. patent application Ser. No. 346,370 referred to previously. Briefly, it consists of a plurality of switching cores 10 linking a conductor 12. It is to be understood that each core 10 is connected to a separate X- or Y-coordinate conductor of a memory matrix (not shown) and that a plurality of conductors 12 are arranged with their associated cores to constitute a switching matrix for driving the memory. For example, a second conductor **12*a* is shown threading one of the cores 10**. Since the embodiment of the invention under description is concerned principally with the power supply to the switching matrix, details of the memory itself will be omitted. The copending patent applications previously referred to and the various publications referenced may be consulted for as detailed a description of these features as may be desired.

The conductor 12 is connected at either end to terminals 14 and 16, respectively, and power from a supply 18 is also connected through current sources 20 and 22 to these terminals. A transistor 24 is connected between terminal 14 and ground and, similarly, a transistor 26 connects terminal 16 to ground. Control circuits 28 and 30 are connected to the bases of transistors 24 and 26 and are arranged to switch their respective transistors between conducting and cut-off condition. In like manner, conductor **12*a* is connected at each end to well known vertical drive circuitry (not shown). When both transistors are conducting, they provide a direct path for each of their current sources to ground and no current flows through the conductor 12. When, however, either transistor is cut-off and the other remains in conducting condition, current flows from both sources through the conducting transistor and thus through the conductor 12 linking the cores 10. In a suitably matrixed arrangement wherein each core 10 is linked by two conductors such as 12 and 12*a***, this current flow produces flux reversing signals in any core appropriately addressed via both its conductors and it in turn transmits read or write signals to a particular X- or Y-conductor in the driven memory matrix.

A principal feature of the invention is that this switching current is made available from sources 20 and 22 only when these sources are connected to the power supply 18 by a closing of the relay contacts K–2A shown in FIG. 1. The control subsystem of FIG. 2 assures that during an initial warm up period power is withheld from these current sources until control circuits 28 and 30 and the various other power supplies, address registers, etc. of the system have achieved proper operational potential and quiescent condition. Similarly, it disconnects the power supply from the current sources to protect the switching cores 10 from spurious signals while these same control circuits and registers are processing through their shut-off excursions.

Figure 2:
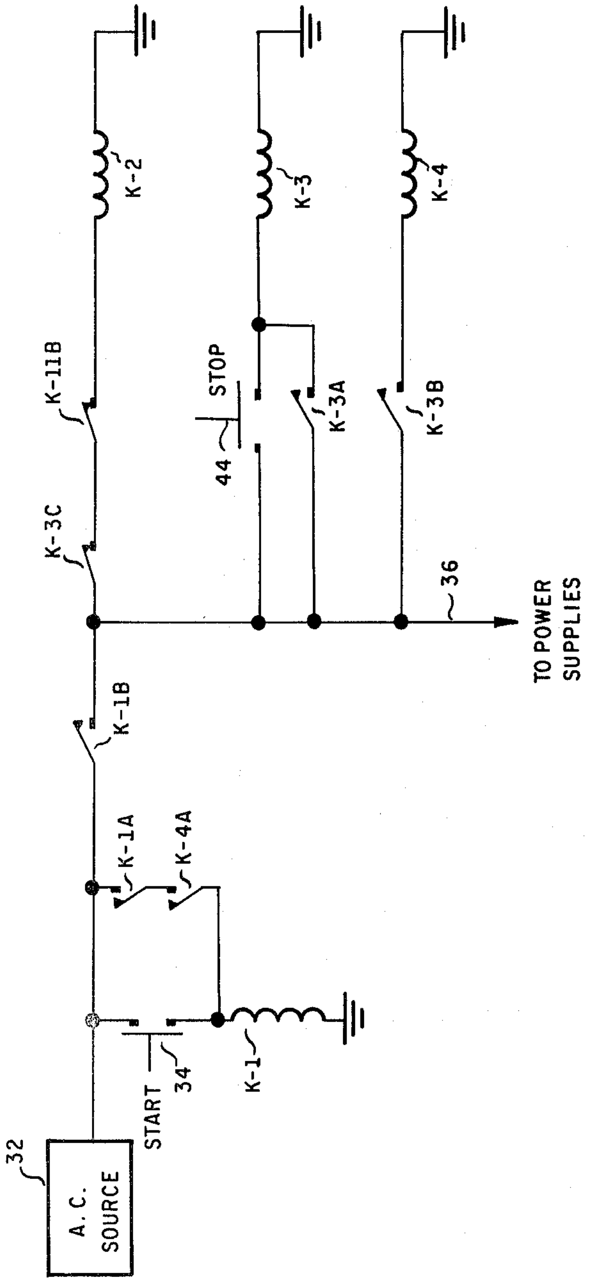
FIG. 2 is a schematic diagram of a power supply control system for the equipment of FIG. 1.

The control system of FIG. 2 features an alternating current source 32 connected to an interconnection of multicontact relays K–1—K–4 which provide a desired sequence of circuit operation in the following manner.

Assume that all relay contacts are shown in their deenergized condition. When the start switch 34 is closed, relay K–1 is energized by power from source 32 and closes relay contacts K–1A which, in combination with normally closed relay contacts K–4A, provide a by-pass around the switch 34 to insure continued operation when manual or automatic closing of the switch has been discontinued.

Energizing relay K–1 also closes contacts K–1B thereby providing power from source 32 to line 36 which leads to power supply 18 (FIG. 1). This causes the various power supplies energized by line 36 to come up to voltage at their leisure and enables the various flip-flop and other circuits throughout the equipment to assume whatever bistable condition is indicated by their various contributing parameters. Specifically, the control circuits 28 and 30 of FIG. 1 come to voltage level and are actuated, in accordance with the particular machine instruction currently under process, to bring their respective transistors into either conducting or cutoff condition.

During this "warm up" period a CLEAR Instruction is delivered to the machine. This may be accomplished manually via switch 40 or automatically. In manual operation, the CLEAR switch at its contacts 42 (FIG. 1) should be spring-loaded or otherwise held for a sufficient period of time to permit the complete system to perform its CLEAR operation. In automatic operation, normally closed contacts K–2B insure a CLEAR operation as soon as power supply 18 is energized via line 36.

Relay K–2 is energized via normally closed contacts K–3C and K–11B when contacts K–1B close. This is a time delay relay which waits a suitable time for power supply 18 and its associated circuits to complete their turn on excursions before operating its contacts. After this delay, contacts K–2A connect the power supply 18 to the current sources 20 and 22, as explained previously, thereby causing the current supply for the switching operation of cores 10 to become available, now that the preliminary transient signal excursions of the system have been safely experienced, without introducing spurious drive pulses to the conductor 12. Also, contacts K–2B open to terminate the CLEAR operation in a manner which permits it to be re-initiated whenever necessary by manual closing of switch 40.

When the equipment is to be turned off, STOP switch 44 is closed and relay K–3 is thereby energized. This closes contacts K–3A to hold the relay in energized condition and opens contacts K–3B and K–3C. The opening of contacts K–3C de-energizes relay K–2 thereby opening contacts K–2A and disconnecting power supply 18 from the current sources 20 and 22. This insures that there will be no further drive pulses to conductor 12 and, consequently, that the contents of the memory at the time the STOP button 44 is pushed will be undisturbed by the various signals attendant upon the rest of the equipment subsiding to shutdown condition. The closing of contacts K–3B energize relay K–4 which has a delay built into its operation of contacts K–4A. After a suitable time interval to insure that power has been disconnected from sources 20 and 22, contacts K–4A open thereby disconnecting relay K–1 from its power source 32 and thus opening contacts K–1B to disconnect source 32 from power line 36. This removes the power for supply 18 and completes the shutdown of the memory drive equipment shown in FIG. 1.

Figure 3:
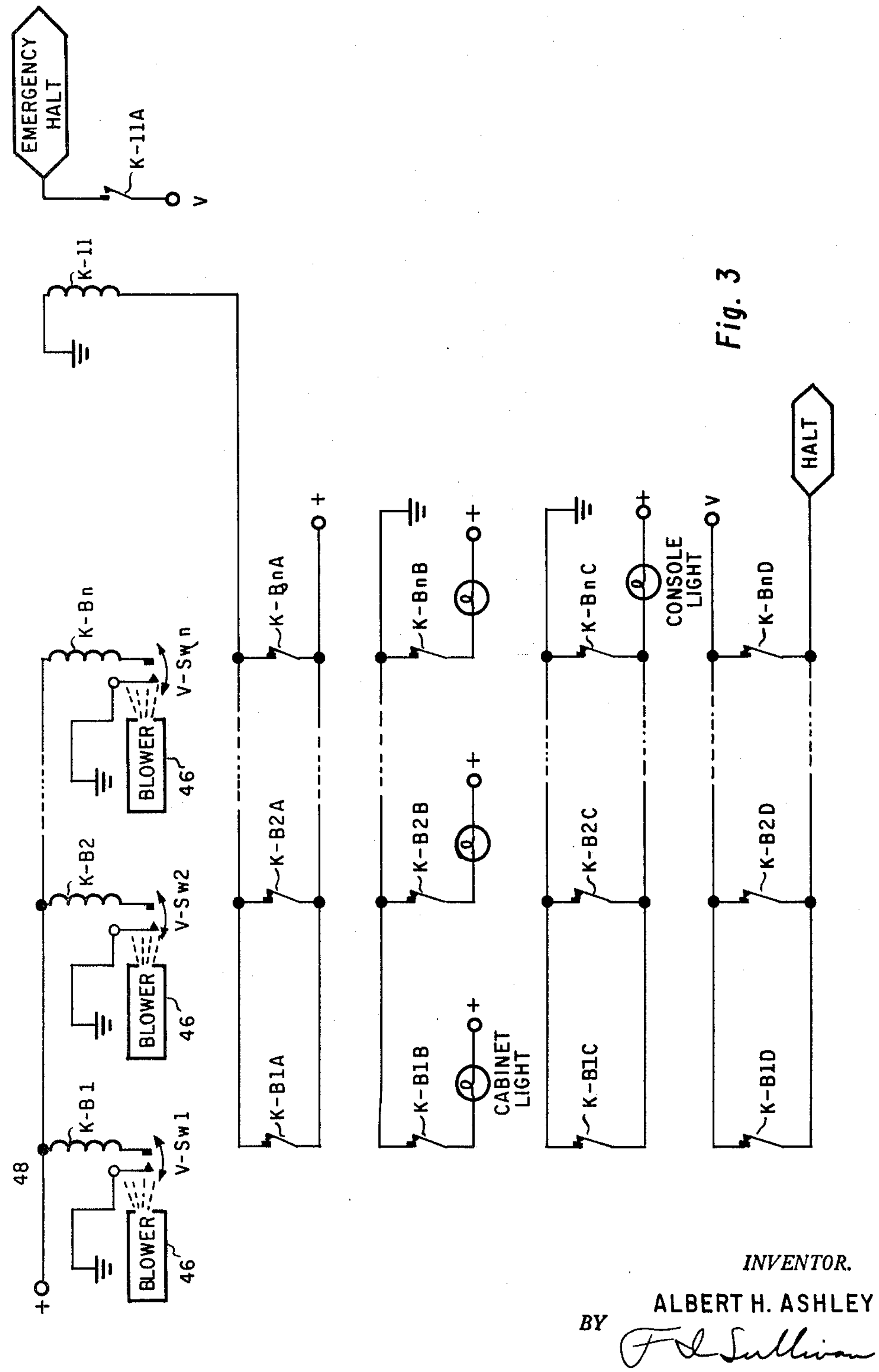
FIG. 3 is a schematic diagram of a memory unit protection system designed to operate in conjunction with the invention.

The control system shown in FIG. 3 demonstrates how the invention may be employed to protect the data content of the memory in the event of emergency situations such as power failure, etc. As an illustration, protection against failure of one of the memory unit cooling blowers will be described.

It may be assumed that a separate blower 46 in each of the cabinets housing the various memory units 1–$n$ (not shown) are connected to the A.C. source 32 (FIG. 2) and that each directs an air current across its respective memory unit to prevent it from overheating. Air current from the blowers 46 closes the contacts V–Sw1–$n$ in the power supply circuit to each of the relays K–B1—K–B$n$. When START switch 34 (FIG. 2) is closed and supplies power, via contacts K–1B, to supply 18, these relays are energized through conductor 48 and, when energized, they each open their respective contacts A–D.

If a blower should fail, the equipment operator must be alerted to the fact that the memory unit associated with this particular blower is starting to heat. There is, generally, no emergency need to shut down the equipment immediately and it may be allowed to operate safely for a period of, for example, five minutes to effect repairs, complete a program or subroutine, etc., before the heated cores become unreliable in operation. The manner in which the operator is alerted and the emergency shutdown of the equipment is delayed is as follows.

As long as all blowers are operating, all contacts A–D of the various blower relays are open. If any blower fails, its particular vane switch opens and its associated contacts K–B (1–$n$) (A–D) close. The closing K–B (1–$n$)A contacts complete a circuit from an appropriate power source to time delay relay K–11 which is arranged to initiate, via contacts K–11A, an EMERGENCY HALT procedure and to de-energize, via contacts K–11B, relay K–2 to disconnect power sources 20 and 22 after a set period of time, e.g., five minutes, has elapsed. The B contacts complete a power circuit to an indicator light on the cabinet housing the particular memory unit endangered and the C contacts energize a blower failure indicator light on the central console cabinet. The D contacts initiate a routine HALT procedure so that the parent equipment may come to a stop at a desirable point in its program before the EMERGENCY HALT initiated by relay K–11 takes effect.

A specific memory control system and equipment shutdown procedure has been described. The invention, however, is not limited to this particular illustrative example but includes the full scope of the following claims.

What is claimed is:

1. An electronic circuit comprising: a plurality of magnetic elements; a conductor connected to said elements; at least one transistor connected to said conductor; a source of switching current; a source of control signals; means for connecting said current source to said transistor; means for connecting said signal source to said transistor; and, a circuit control subsystem connected to said current source and said signal source arranged to permit said switching current source to be connected to said transistor only after said signal source has first been so connected and to prevent said signal source from being disconnected from said transistor until after said current source has first been disconnected.

2. An electronic circuit comprising: a plurality of magnetic elements; a conductor connected to said elements; at least one switching device connected to said conductor; a source of switching current; a source of control signals; means for connecting said current source to said switching device; means for connecting said signal source to said switching device; and, a circuit control subsystem connected to said current source and said signal source and arranged to permit said switching current source to be connected to said switching device only after said signal source has first been so connected and to prevent said signal source from being disconnected from said switching device until after said current source has first been disconnected.

3. An electronic circuit comprising: a plurality of magnetic elements; a conductor connected to said elements; at least one semiconductor device connected to said conductor; a source of switching current; a source of control signals; means for connecting said current source to said semiconductor device; means for connecting said signal source to said semiconductor device; and, a circuit control subsystem connected to said current source and said signal source and arranged to permit said switching current source to be connected to said semiconductor device only after said signal source has first been so connected and to prevent said signal source from being disconnected from said semiconductor device until after said current source has first been disconnected.

4. In a magnetic core memory system of the type wherein a plurality of memory cores are linked by first conductors connected to switching cores, a drive system for said switching cores comprising: a plurality of second conductors linking said switching cores in selected combinations; at least one transistor connected to each of said second conductors, said transistor having collector, base and emitter electrodes; a source of switching current connected to the collector-emitter circuit of said transistor; a source of control signals connected to the base of said transistor; a power supply connectable to said current source and to said control signal source; a first relay having a set of switching contacts arranged to energize said power supply; and relay having a delay cycle for operating its contacts; means controlled by said first relay operative to energize said second relay; a set of contacts operable by said second relay to connect said power supply to said current source; a third relay; a fourth relay; means operable by said third relay for de-energizing said second relay and for energizing said fourth relay; and means operable by said fourth relay for de-energizing said power supply subsequent to said de-energizing of said second relay.

5. For a magnetic memory unit operable by at least one switching device connected to a source of switching current and a source of control signals, a control subsystem comprising: means operative to sense that said memory unit should be rendered inoperative; a first relay operable by said sensing means; at least one alarm device operable by said first relay; a second relay, having a time delayed actuating cycle, operable by said first relay; and, means operable by said second relay at the end of its delayed cycle to first de-energize said source of switching current and later de-energize said source of control signals.

References Cited by the Examiner

UNITED STATES PATENTS

| | | | |
|---|---|---|---|
| 2,374,974 | 5/1945 | Blume | 307—112 |
| 2,629,089 | 2/1953 | Fairbairn et al. | 340—239 |
| 2,734,184 | 2/1956 | Rajchman | 340—174 |
| 2,812,511 | 11/1957 | Cleveland | 340—239 |
| 2,863,071 | 12/1958 | Wouk | 307—93 |
| 2,917,727 | 12/1959 | Reach | 340—174 |
| 2,958,074 | 10/1960 | Kilburn et al. | 340—174 |
| 2,983,828 | 5/1961 | Samuel | 307—88 |
| 2,993,198 | 7/1961 | Barnes et al | 340—174 |
| 3,056,948 | 10/1962 | Lee | 340—174 |
| 3,094,689 | 6/1963 | Wahlstrom | 307—88 X |

IRVING L. SRAGOW, *Primary Examiner.*

JOHN F. BURNS, *Examiner.*

R. JENNINGS, M. S. GITTES, *Assistant Examiners.*